(12) United States Patent
Saito

(10) Patent No.: US 7,258,830 B2
(45) Date of Patent: Aug. 21, 2007

(54) METHOD FOR DIRECT BLOW MOLDING

(75) Inventor: Kazuyuki Saito, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 422 days.

(21) Appl. No.: 10/918,747

(22) Filed: Aug. 16, 2004

(65) Prior Publication Data
US 2005/0040568 A1 Feb. 24, 2005

(30) Foreign Application Priority Data
Aug. 18, 2003 (JP) .............. 2003-294641

(51) Int. Cl.
*B29C 49/22* (2006.01)
*B29C 49/58* (2006.01)
(52) U.S. Cl. ............... 264/523; 425/535; 425/536
(58) Field of Classification Search ............... 264/523
See application file for complete search history.

(56) References Cited
U.S. PATENT DOCUMENTS
4,382,769 A * 5/1983 Younkin et al. .......... 425/525
4,954,071 A * 9/1990 Austin .................. 425/531
2002/0154200 A1 10/2002 Miyazawa et al.

\* cited by examiner

*Primary Examiner*—Christina Johnson
*Assistant Examiner*—Monica A Huson
(74) *Attorney, Agent, or Firm*—Sughrue Mion, PLLC

(57) ABSTRACT

A method for direct blow molding including steps of: inserting a blowing jig for blowing air into an inside of a prison; locating the two dies to positions so that the two dies face each other across the parison, wherein two dies have a inner space shape, of which overlapping section with the blowing jig is smaller than the outside diameter of a parison; forming the overlapping section between the parison and the blowing jig, to be smaller than an outside diameter of the parison by using a space between the two dies and the blowing jig when the blowing jig is inserted into an inside of the parison and when the two dies are combined together; and depositing a metal layer to the surface by vapor deposition.

2 Claims, 12 Drawing Sheets

METHOD FOR DIRECT BLOW MOLDING

This patent application claims priority from a Japanese Patent Application No. 2003-294641 filed on Aug. 18, 2003, the contents of which are incorporated herein by reference.

BACKGROUND OF THE INVENTION

1. Field of the Invention

The present invention relates to a method for a direct blow molding. More particularly, the present invention relates to a method for a direct blow molding suitable for a manufacturing of a liquid accommodating container.

2. Description of the Related Art

An ink-jet type recording apparatus, which is an example of a liquid ejecting apparatus, does recoding by ejecting ink droplets onto a recording medium from a liquid ejecting head. The ink-jet type recording apparatus includes a liquid cartridge for holding ink, which is detachably mounted on the ink-jet type recording apparatus. The liquid cartridge supplies ink to the liquid ejecting apparatus while mounted on the liquid ejecting apparatus. US Laid-open patent application No. 2002/0154200.

It is considered that the liquid cartridge is manufactured by forming a liquid accommodating container made of resin in a resin case. In order to supply the liquid to the exterior of the resin case, it is necessary to form the liquid accommodating container so that a part of the container may be salient and the part is exposed to the exterior of the resin case as a liquid supplying part. Sometimes, bumps are provided at the outside of the supplying part to fix the supplying part to the resin case. It is desired to manufacture the liquid accommodating container at low cost having such shapes described above.

SUMMARY OF THE INVENTION

To achieve the above and other objects, according to the first aspect of the present invention, a method for direct blow molding, includes steps of: preparing two dies of which an overlapping section overlaps with a blowing jig for blowing air and wherein a cross section area of at least a part of the overlapping section is smaller than a cross section area of a parison when the two dies are combined together; locating the two dies to each positions so that the two dies face each other across the parison; and forming the overlapping section between the parison and the blowing jig. The step of forming the overlapping section between the parison and the blowing jig comprises steps of: inserting the blowing jig into an inside of the parison; combining the two dies together, forming the overlapping section between the parison and the blowing jig to be smaller than an outside diameter of the parison by using a space between the two dies and the blowing jig. According to the method for direct blow molding, a structure having some parts of which size is smaller than that of parison can be formed.

The step of preparing two dies may include a step of preparing a die for manufacturing a liquid accommodating container for keeping a liquid which are to be supplied to a liquid ejecting apparatus to record by ejecting the liquid; wherein the liquid accommodating container formed by the die comprises a supplying part, which supplies the liquid to the liquid ejecting apparatus, wherein the supplying part protrudes from the liquid accommodating container, is integrated with the liquid accommodating container, and is a hollow member allowing communication with a inside part of the liquid accommodating container. The step of forming the overlapping section between the parison and the blowing jig may include a step of forming the supplying part by using the space between the two dies and the blow jig. The method may further comprise a step of: blowing air from the blowing jig to form the parison to a shape of the liquid accommodating container. Thus, according to the direct blow molding, both the main body of the liquid accommodating container and the supplying part can be formed simultaneously. Therefore, the liquid accommodating container can be manufactured at low cost.

The liquid accommodating container may be mounted with the liquid ejecting apparatus with being held in a case; and the case may comprise a hole through which the supplying part is exposed to an exterior. The step of inserting the blowing jig into an inside of the parison may include a step of: inserting the blowing jig of which shapes of cross section are different and wherein the number of the shapes is equal to or greater than two, and the step of forming the overlapping section between the parison and the blowing jig further may comprise steps of: forming a root part of the supplying part so that an outside diameter of the root part becomes smaller than an inside diameter of the hole; and forming a tip part of the supplying part so that an outside diameter of the tip part becomes greater than the hole. In this case, the supplying section can be formed simultaneously with the main body of the liquid accommodating container. Therefore, the liquid accommodating container can be manufactured at low cost.

The parison may include a low density polyethylene layer, an ethylene-vinylalcohol copolymer layer and a liner low density polyethylene layer in an order of the low density polyethylene layer, the ethylene-vinylalcohol copolymer layer and the liner low density polyethylene layer from inner side, and the liquid accommodating container may be formed by resin which is stacked with the low density polyethylene, the ethylene-vinylalcohol copolymer and the liner low density polyethylene in the order of the low density polyethylene, the ethylene-vinylalcohol copolymer and the liner low density polyethylene. Since the liquid accommodating container includes the ethylene-vinylalcohol copolymer layer, the atmospheric air cannot easily transmit the body of the case. Therefore, it is not so easy for the air to solve in the liquid.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

Figure 1:
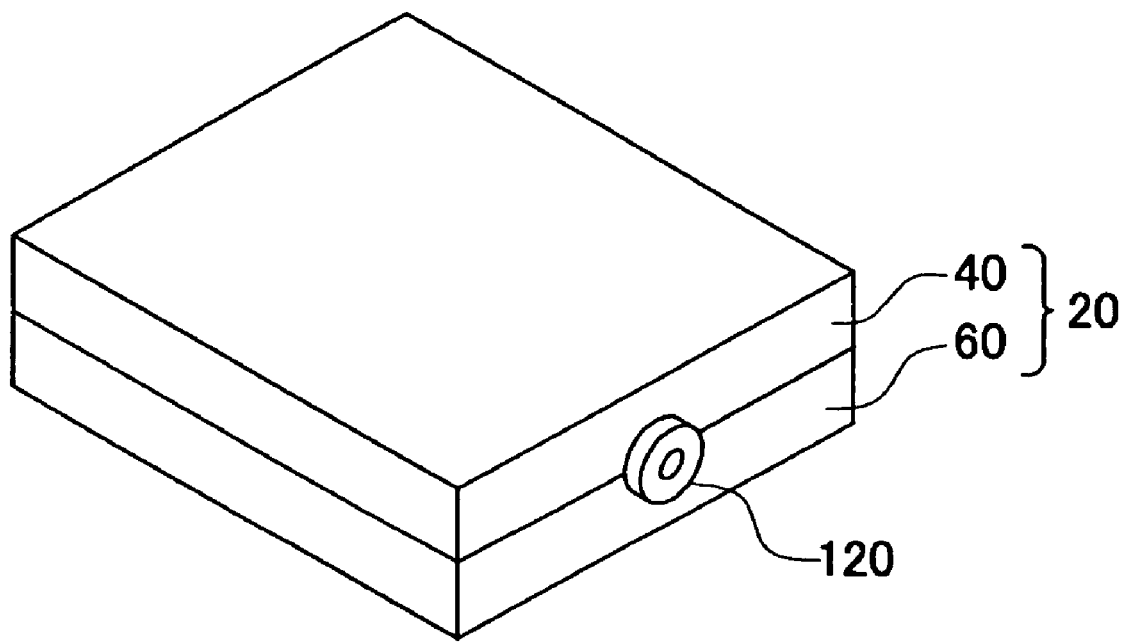
FIG. 1 is a perspective view of an ink cartridge.
Figure 2:
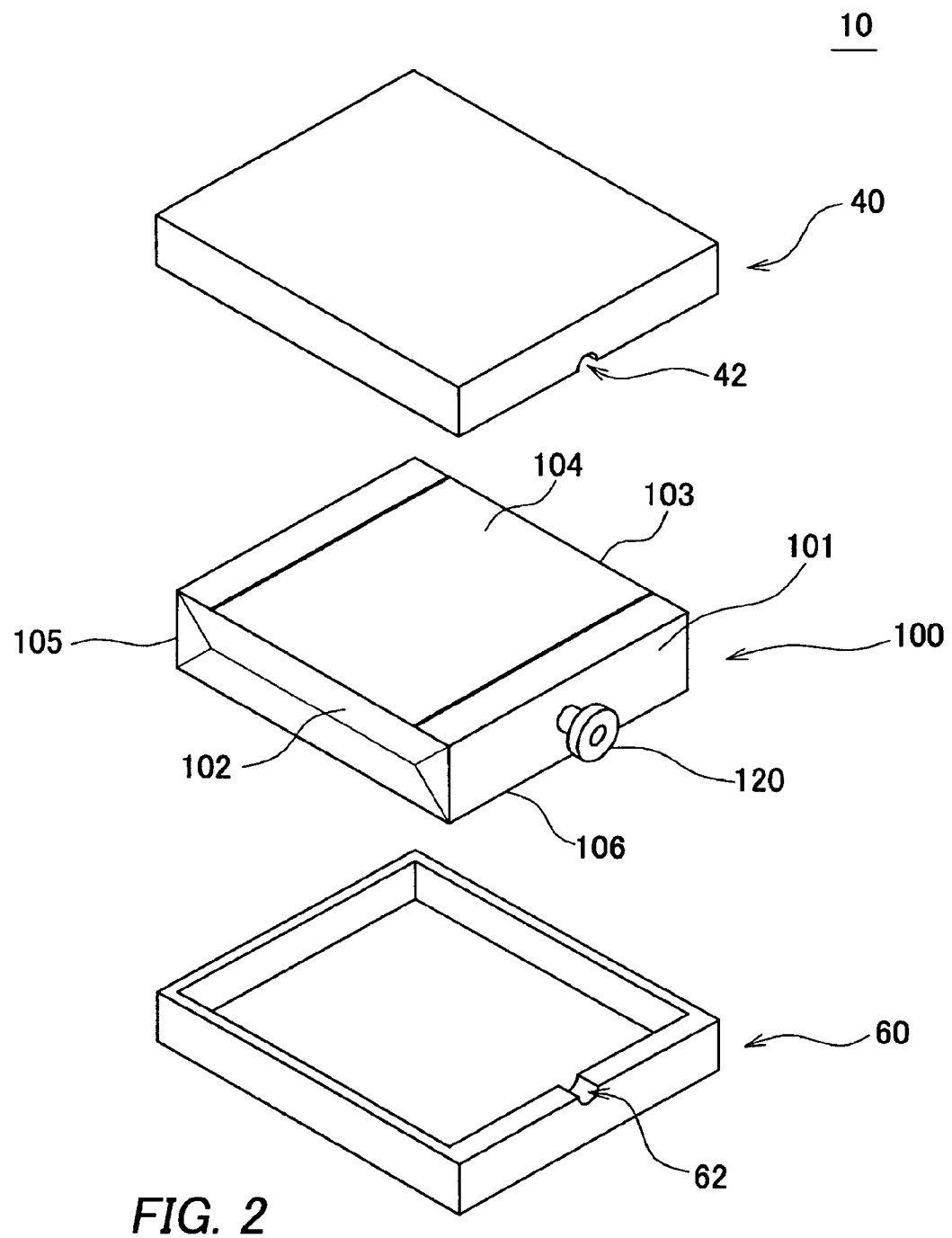
FIG. 2 is an exploded perspective view of the ink cartridge.

FIG. 1 is a perspective view of the ink cartridge 10 according to an embodiment of the present invention. FIG. 2 is an exploded perspective view of the ink cartridge 10. The ink cartridge 10 is mounted with the ink-jet recording apparatus which ejects the ink to the recording medium such as a recording paper to record, and supplies the ink to the ink-jet recording apparatus. The ink cartridge 10 includes a resin case 20 and an ink accommodating container 100 which is accommodated in the resin case 20 and made of flexible resin. Each of the outer shape of the resin case 20 and the inner space shape of the resin case 20 is rectangular parallelepiped and the resin case 20 is sandwiched between an upper cover 40 and a bottom cover 60. The upper cover 40 and the bottom cover 60 are in a plane symmetry. The shape of the main body of the ink accommodating container 100 is rectangular parallelepiped and holds the ink inside. The ink accommodating container 100 includes a supplying part 120 on a front edge face 101 which extends along a longitudinal direction of the main body, and the supplying part 120 supplies the ink to the ink-jet recording apparatus. The shape of the supplying part 120 is cylindrical and is exposed to the exterior of the resin case 20 from a circular opening which is formed by the assembly of an opening 42 at the upper cover 40 and an opening 62 at the bottom cover 60. For example, the ink accommodating container 100 is manufactured by the direct blow molding method. When the ink accommodating container is filled up with the ink, there is almost no clearance in the resin case 20. Thus, the ink cartridge 10 can hold the ink efficiently in the inner space. In addition, a section for keeping the ink can be formed without welding the film to the inner face of the resin case 20. Therefore, the number of the manufacturing process can be reduced.

In the ink accommodating container 100, a side face 102 and a side face 103, which are perpendicular to the front edge face 101 and they are also faced with each other, are folded into an inside of the ink accommodating container 100 as the ink is being supplied from the ink accommodating container 100. In addition, both an upper face 104 and a bottom face 106 are also folded into the inside of the ink accommodating container 100. For this reason, the amount of the ink which remains inside the ink accommodating container 100 decreases.

Figure 3:
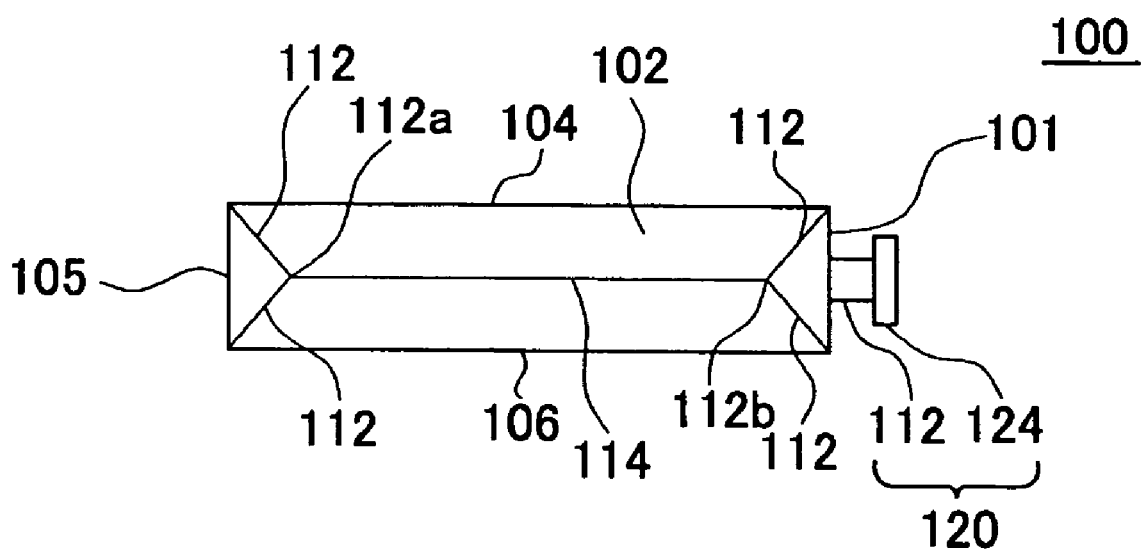
FIG. 3 is a side view of an ink accommodating container.

FIG. 3 is a side view of the ink accommodating container 100. The side face 102 includes four diagonal fold lines 112 extending from the four corners of the side face 102 to form two isosceles triangles and the side face 102 further includes a middle fold line 114 connecting intersecting points 112a and 112b corresponding to an intersection of two diagonal fold lines 112 which are located above and below, respectively. For example, each of the four diagonal fold lines 112 is on an angle of 45 degrees with each side which forms the side face 102 and extends until each of diagonal fold lines 112 meets the other diagonal fold line 112. The middle fold line 114 extends in parallel with both an upper side and a bottom side at the midway between the upper side and the bottom side of the side face 102. A side face 103 has the same configurations, i.e. four diagonal fold lines 112 and a middle fold line 114, as those of the side face 102. Therefore, the side face 102 and the side face 103 are folded into the inside of the ink accommodating container 100 along the four diagonal fold lines 112 and the middle fold line 114 as the ink is supplied from the ink accommodating container 100 to the ink-jet recording apparatus.

Figure 4:
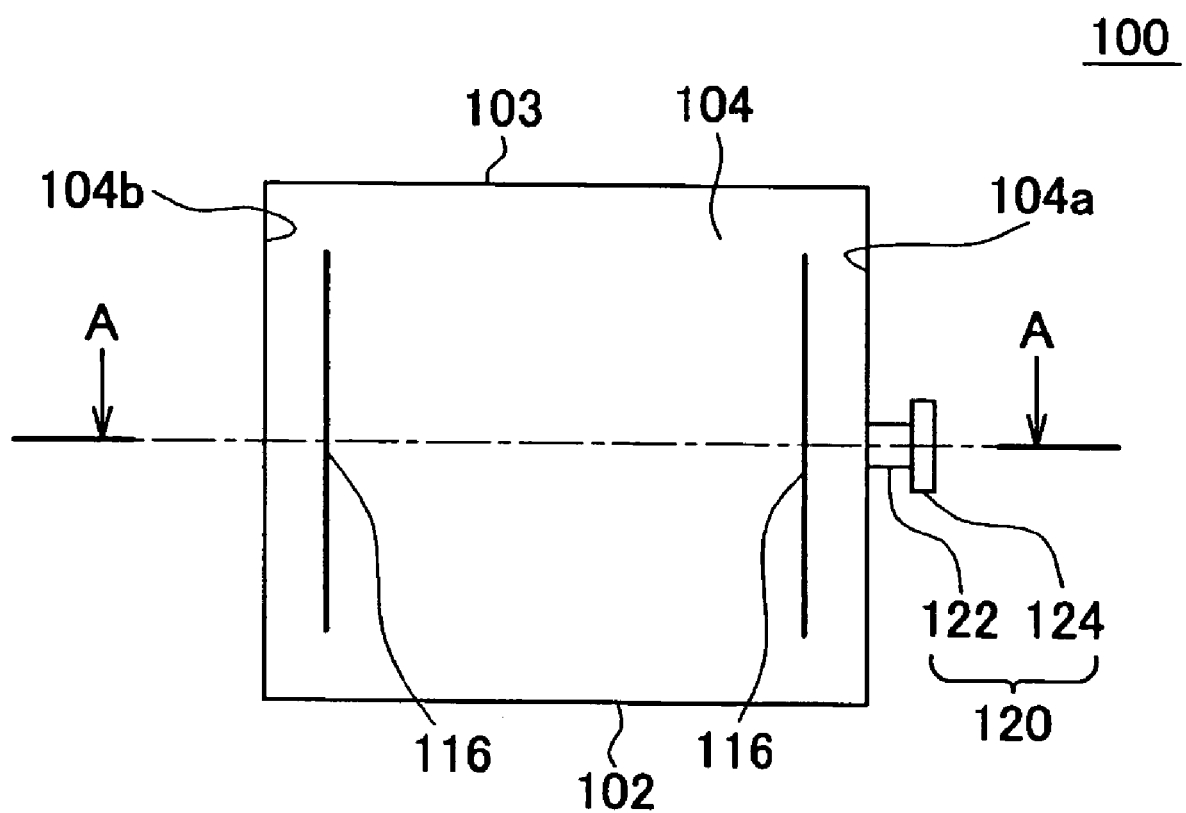
FIG. 4 is a top view of the ink accommodating container.

FIG. 4 is a top view of the ink accommodating container 100. In the case of manufacturing the ink accommodating container 100 by the direct blow molding method, since the thickness of each of front edge face 101 and rear edge face 105 is formed to be thicker than that of other faces, it is not so easy to fold the front edge face 101 and the rear edge face 105. Thus, according to the present embodiment of the ink accommodating container 100, each of the upper face 104 and the bottom face 106 includes two assist fold lines 116. One of the assist fold line 116 is formed in parallel with the front edge face 10. The length between the assist fold line 116 and the front edge face 101 is about half of the length between the upper face 104 and the bottom face 106. The other assist fold line 116 is formed in parallel with the front edge face 101. The length between the assist fold line 116 and the rear edge face 105 is about half of the length between the upper face 104 and the bottom face 106. Accordingly, both the upper face 104 and the bottom face 106 are folded inside, as the side face 102 and the side face 103 is folded. In this case, a vicinity of the front edge face 101 of each of the rear edge face 105 and the upper face 104 is in parallel with the front edge face 101 and a vicinity of the rear edge face 105 of each of the upper face 104 and the rear edge face 105 is in parallel with the rear edge face 105.

Figure 5A:
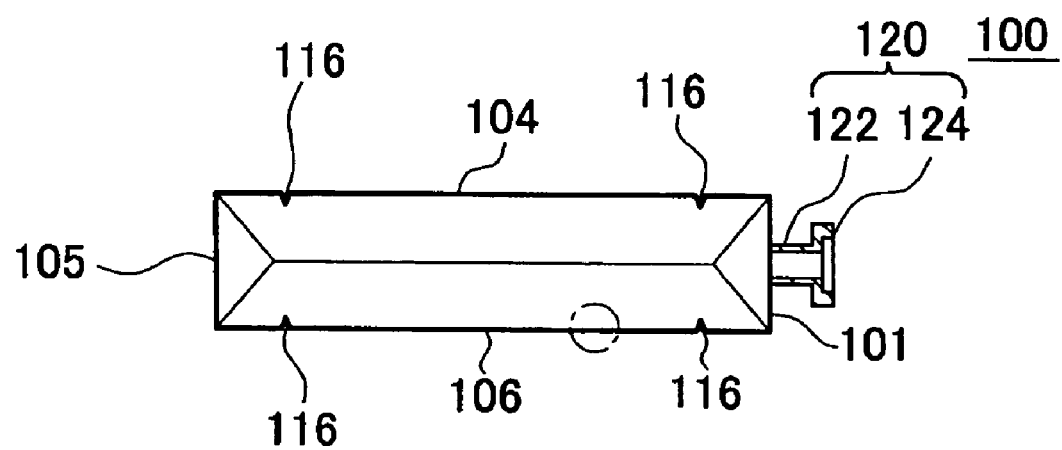
FIG. 5A is A-A sectional view of FIG. 4.

FIG. 5A is A-A sectional view of FIG. 4. The assist fold lines 116 are formed as a linear groove on the upper face 104 or on the bottom face 106. Accordingly, the upper face 104 and the bottom face 106 can be easily folded along the assist fold lines 116.

In addition, in the supplying part 120, outside diameter of each of the tip part 124 and the inside diameter of the tip part 124 is larger than that of the root part 122. The outside diameter of the root part 122 is a little smaller than an inside diameter of a circular opening which are formed by both the opening 62 of upper cover 40 and the opening 62 of the bottom cover 60. The outside diameter of the tip part 124 is larger than the inside diameter of this opening. Accordingly, the supplying part 120 is securely fixed to the resin case 20.

Figure 5B:
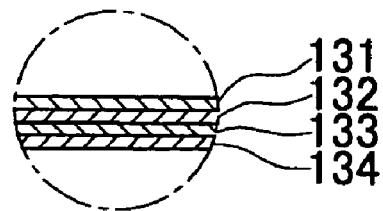
FIG. 5B is an enlarged view of the area surrounded by chained line in FIG. 5A.

FIG. 5B is an enlarged view of the area surrounded by chained line in FIG. 5A. Flexible material which forms the ink accommodating container 100 is a resin film, which is stacked with a first base layer 131, a gas barrier layer 132, a second base layer 133, and a metal layer 134 in the order of the first base layer 131, the gas barrier layer 132, the second base layer 133, and the metal layer 134 from the inner side of the ink accommodating container 100. The first base layer 131 and the second base layer 133 are served as base of the flexible material and, for example, the first base layer 131 is made of linear low density polyethylene and the second base layer 133 is made of low density polyethylene. In this case, since the flexible material has flexibility, the side face 102 and the side face 103 are easily folded. The gas barrier layer 132 prevents air from transmitting the ink accommodating container 100 and also prevents air from solving into the ink. For example, the gas barrier layer 132 is made of ethylene-vinyl alcohol copolymer, which is sandwiched between the first base layer 131 and the second base layer 133 thereby to be held between them. The metal layer 134 prevents the solvent of the ink from transmitting the ink accommodating container 100. The metal layer 134 is, for example, an aluminum layer, which is formed on the second base layer 133 by vapor deposition.

Figure 6A:
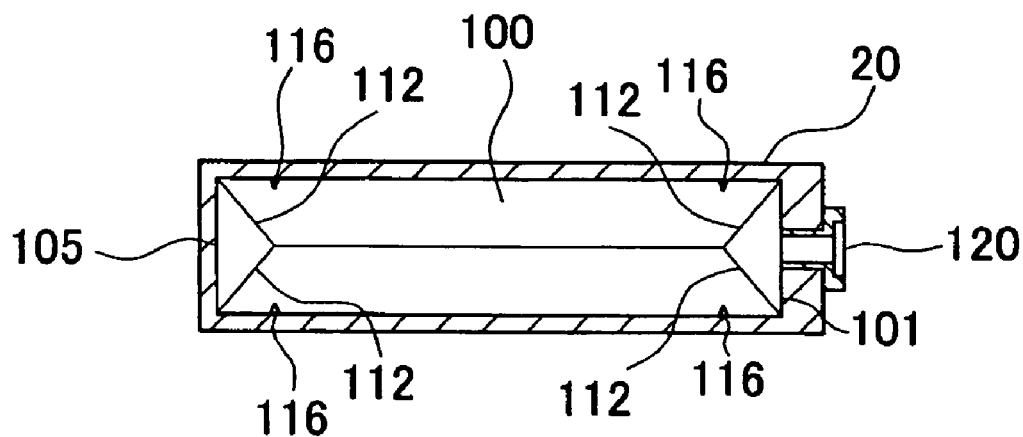
FIG. 6A is a sectional view of the ink accommodating container 100 in a longitudinal direction when the ink accommodating container is filled with ink.

FIG. 6A is a sectional view of the ink accommodating container 100 in a longitudinal direction when the ink accommodating container 100 is filled with ink. When the ink accommodating container 100 is filled with the ink, the side face 102, the side face 103, the upper face 104 and the rear edge face 105 are not folded. While the front edge face 101 is fixed to the resin case 20 via the supplying part 120, the rear edge face 105, which is opposite to the front edge face 101, is not fixed to the resin case 20, so that the rear edge face 105 is allowed to move in the resin case 20.

Figure 6B:
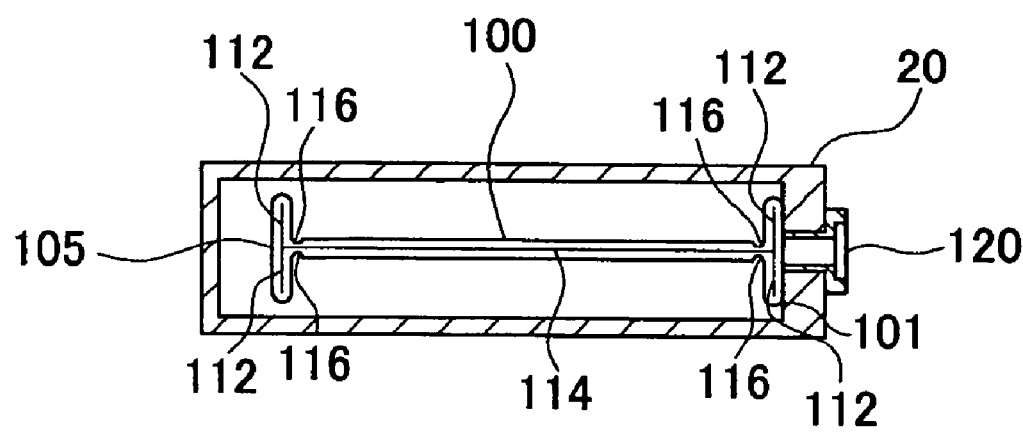
FIG. 6B is a sectional view of the ink accommodating container in a longitudinal direction when the ink accommodating container is substantially empty.
Figure 7:
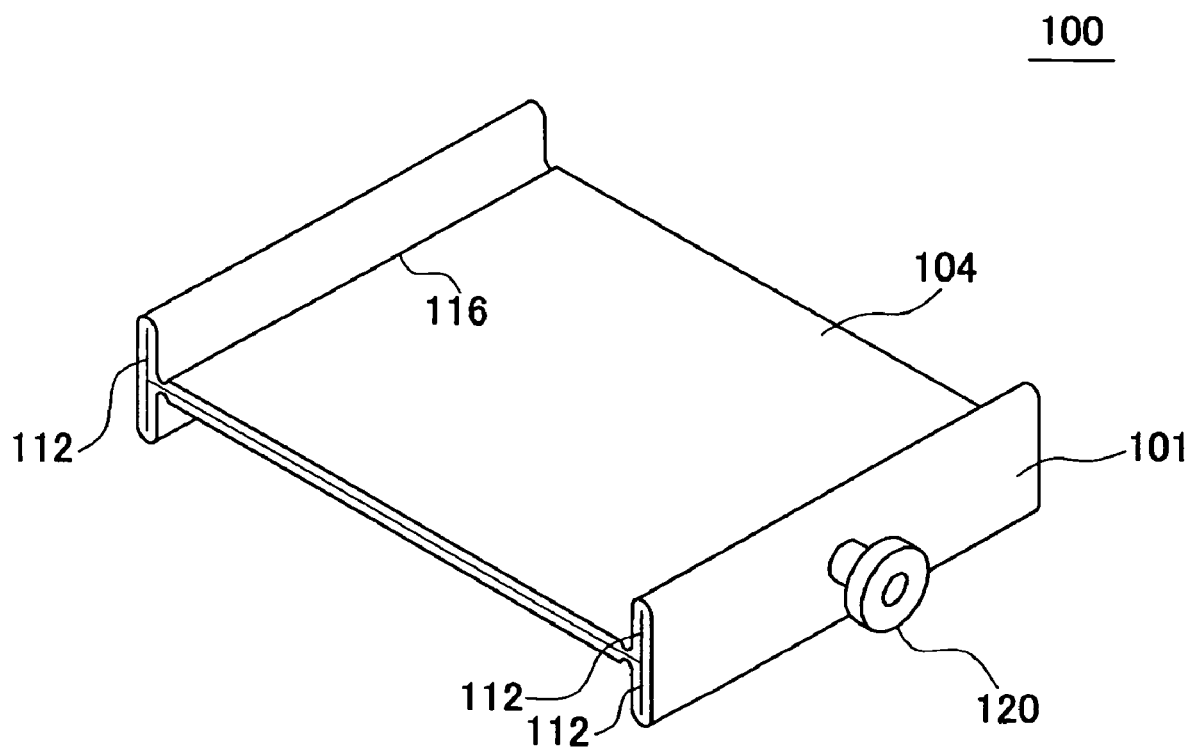
FIG. 7 is a perspective view of the ink accommodating container when the ink accommodating container is substantially empty.

FIG. 6B is a sectional view of the ink accommodating container 100 in a longitudinal direction when the ink in the ink accommodating container 100 has run out. FIG. 7 is a perspective view of the ink accommodating container 100 when the ink in the ink accommodating container 100 has run out. As described above, the side face 102, the side face 103, the upper face 104 and the bottom face 106 are folded into the inside of the ink accommodating container 100 when the ink accommodating container 100 is substantially empty. Here, the front edge face 101 is fixed to the resin case 20 and the rear edge face 105 is allowed to move in the resin case 20. Accordingly, the rear edge face 105 approaches to the front edge face 101 as the ink is consumed from the ink accommodating container 100 and then the side face 102 and the side face 103 are folded. Moreover, the upper face 104 and the bottom face 106 are in contact with each other and an end part of the upper face 104 near the front edge face 101 is folded along the assist fold line 116 to contact with the front edge face 101 and another end part of the bottom face 106 near the rear edge face 105 is also folded along the assist fold line 116 to contact with the rear edge face 105. Thus, there is little space in the ink accommodating container 100 when the ink in the ink accommodating container 100 has run out. Therefore, the front edge face 101 and ink accommodating container 100 can supply almost all ink therein.

Figure 8:
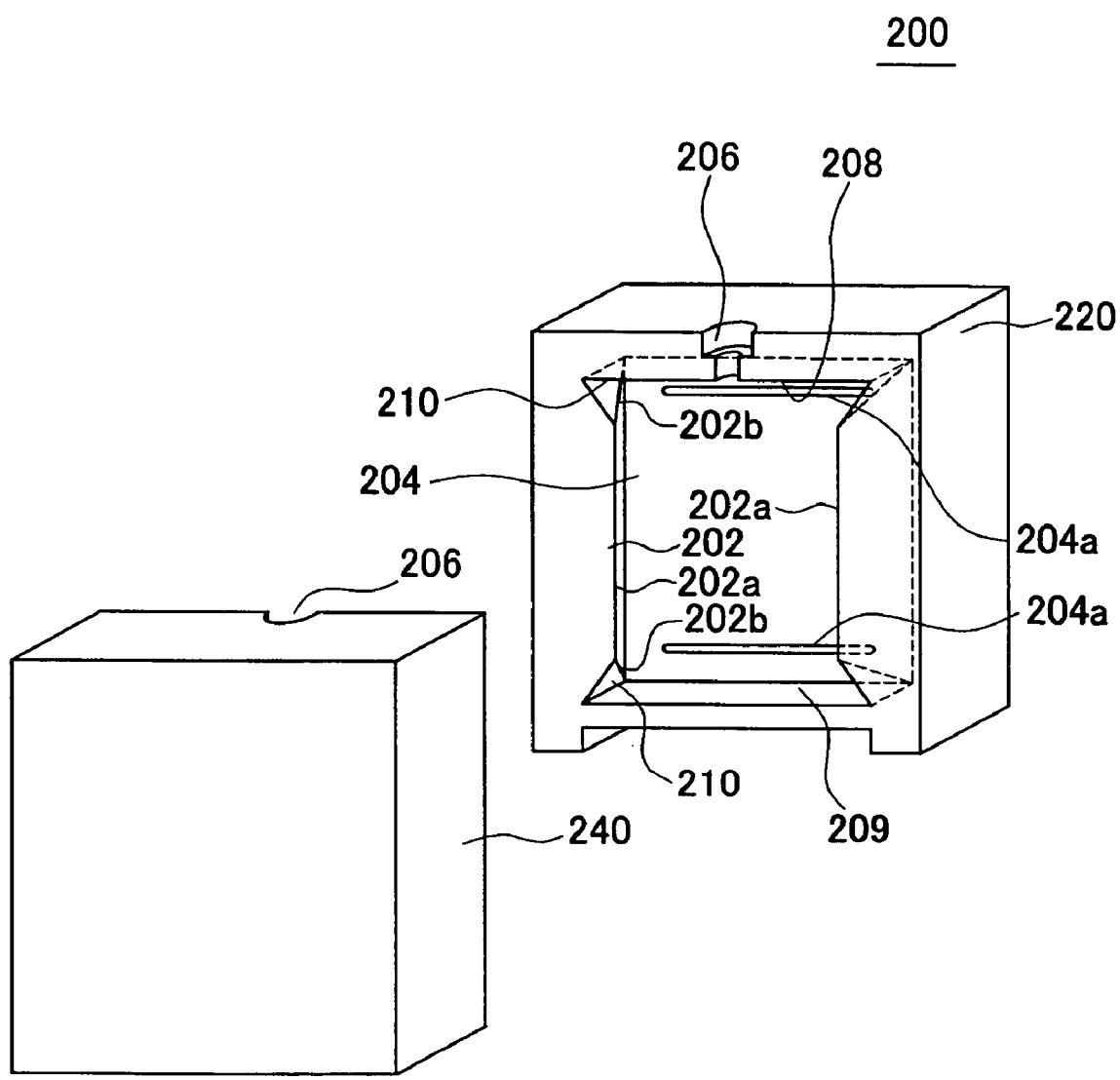
FIG. 8 is a perspective view of the die used for the manufacture of the ink accommodating container.
Figure 9:
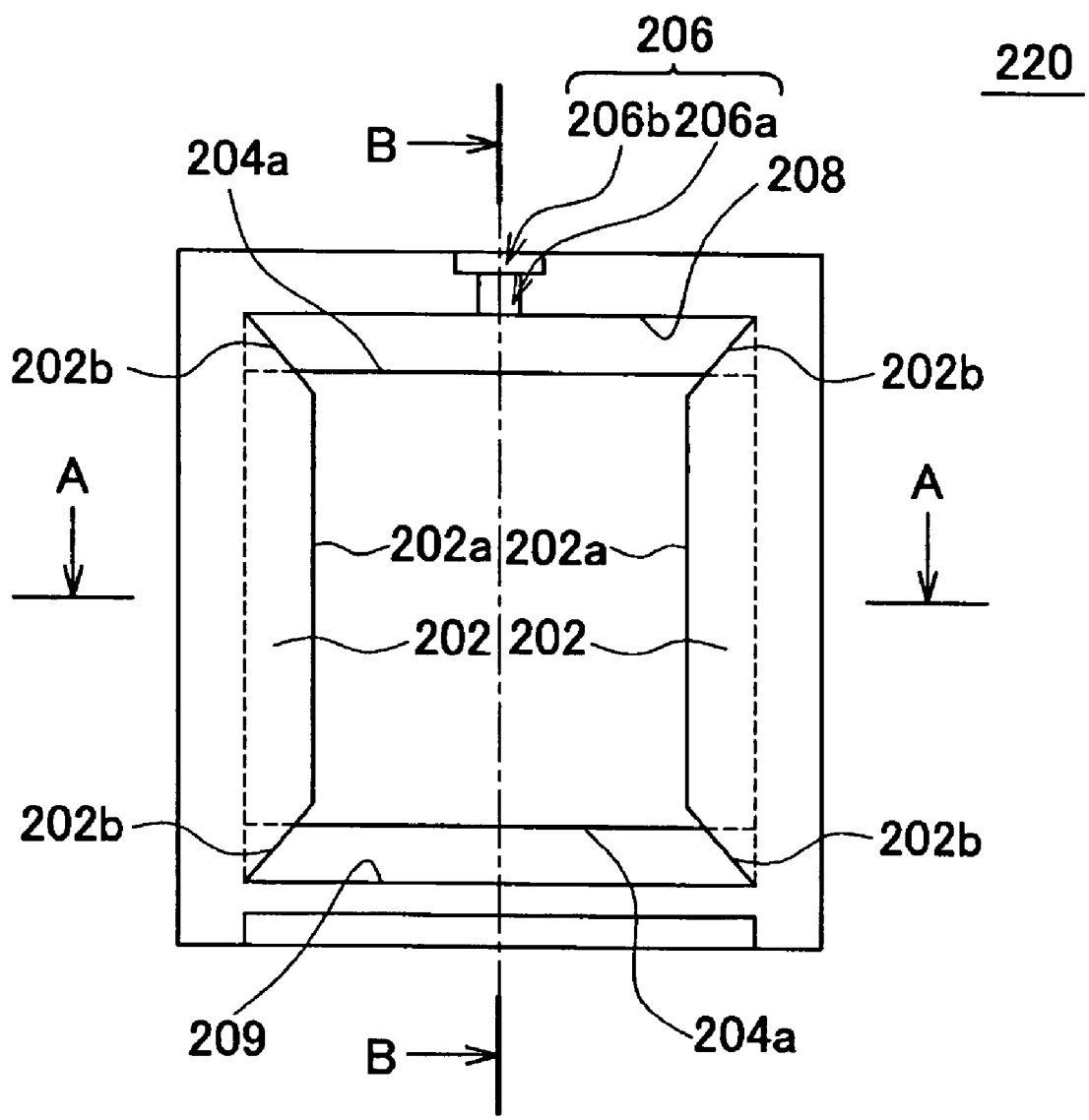
FIG. 9 is a plan view of the die included in the die.
Figure 10:
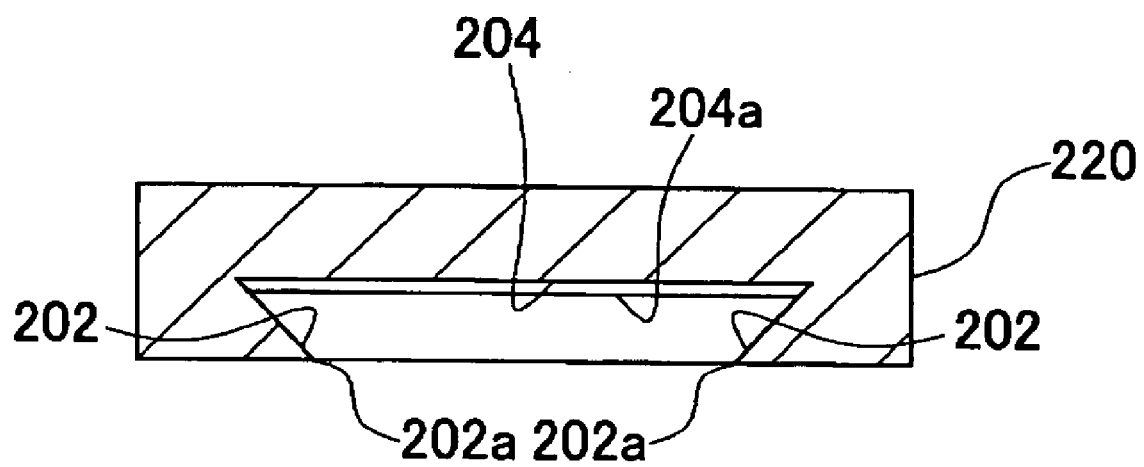
FIG. 10 is an A-A sectional view of the die in FIG. 9.

FIG. 8 is a perspective view of the die 200 which is used when the ink accommodating container 100 is manufactured by the direct blow molding method. FIG. 9 is a plan view of die 220 included in the die 200. FIG. 10 is an A-A sectional view of the die 220 in FIG. 9. As shown in FIG. 8, the die 200 includes a die 220 and a die 240. A concave part of the inner face of the die 220 and a concave part of the inner face of the die 240 are plane symmetry each other. Each of these concave parts includes a shape which is produced from the ink accommodating container 100 that is divided by a plane including the middle fold line 114 of the side face 102 and the middle fold line 114 of the side face 102 as shown in FIG. 3. The die 220 includes a die side face 202 for forming both the side face 102 and the side face 103 of the ink accommodating container 100, a die upper face 204 for forming the upper face 104, a die front edge face 208 for forming the front edge face 101, and a die rear edge face 209 for forming the rear edge face 105. In addition, the die upper face 204 of the die 240 forms the bottom face 106.

As shown in FIG. 8, each of the die front edge face 208 and the die rear edge face 209 is rectangular, and they forms both of the front edge face 101 and the rear edge face 105 of the ink accommodating container 100 as shown in FIG. 2 when the die 220 and die 240 are sandwiched each other.

In addition, the die front edge face 208 includes a blowing jig insertion opening 206. The blowing jig is inserted into this blowing jig insertion opening 206, thereby the supplying part 120 of the ink accommodating container 100 is formed between the blowing jig insertion opening 206 and the blowing jig. The blowing jig insertion opening 206 has a root part forming part 206a which forms the outside of the root part 122 of the supplying part 120 and a tip part forming part 206b which forms the outside of the tip part 124 of the supplying part 120. The shape of the cross-section of the root part forming part 206a is semicircular and the root part forming part 206a connects the concave part of the die 200 and the tip part forming part 206b. The shape of the cross-section of the tip part forming part 206b is also semicircular and the tip part forming part 206b is connected to the outer face of the die 200. The inside diameter of the root part forming part 206a is little smaller than that of the opening 42 of the upper cover 40 shown in FIG. 2. Therefore, in the supplying part 120 of the ink accommodating container 100, the root part 122 is formed so that the outside diameter of the root part 122 becomes smaller than the inside diameter of the opening 42, and the tip part 124 is formed so that the outside diameter of the tip part 124 becomes larger than the inside diameter of the opening 42.

As shown in FIGS. 8 and 9, the die upper face 204 has two convex parts 204a, which are formed to be linear. One convex part 204a is formed on a vicinity of the die front edge face 208 in parallel with the die front edge face 208 and the other convex part 204a is formed on a vicinity of the die rear edge face 209 in parallel with the die rear edge face 209, thereby they form the assist fold lines 116 of the ink accommodating container 100.

Each of the two die side faces 202 on the concave part of the die 220 forms the side face 102 or the side face 103 respectively when the die 220 and the die 240 are sandwiched together. As shown in FIGS. 8 and 10, the die side face 202 slightly slopes to the inside of the die 220 and projects to the inside of the die 220. The die side face 202 has a triangular cutout face 210 at a boundary between the die side face 202 and the die front edge face 208 in order to form the die front edge face 208 to be rectangular and also has another triangular cutout face 210 at a boundary between the die side face 202 and the die rear edge face 209 in order to form the die rear edge face 209 to be rectangular. In addition, the die side face 202 has a middle fold line forming part 202a and a diagonal fold line forming part 202b. The middle fold line forming part 202a is a linear convex part which forms the boundary between the die side face 202 and the inner face of the die 220 and the middle fold line forming part 202a forms the middle fold line 114 when the die 220 and the die 240 are sandwiched. The diagonal fold line forming part 202b is a liner and acute-angled convex part which forms the boundary between the cutout face 210 and the die side face 202, and the diagonal fold line forming part 202b forms the diagonal fold lines 112.

Figure 11:
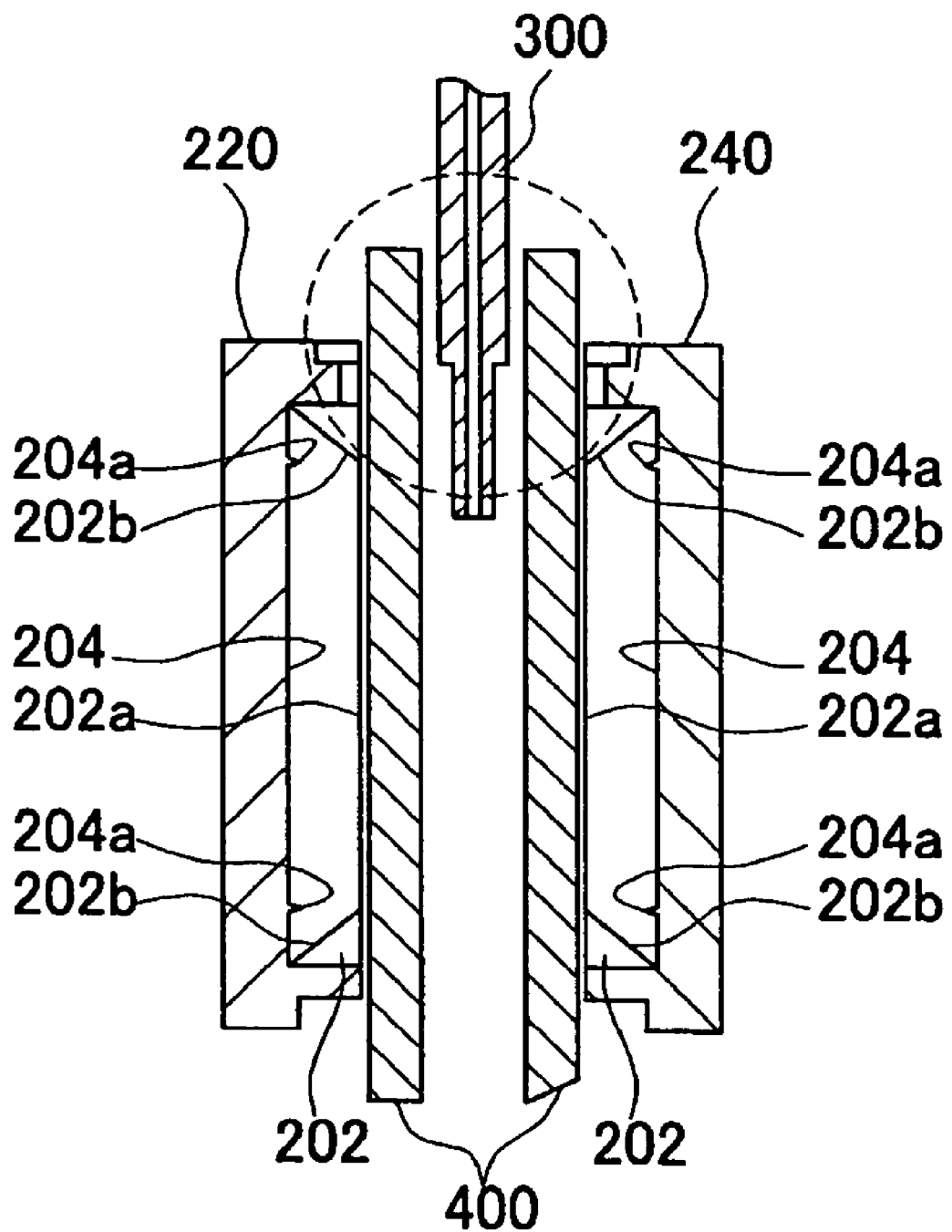
FIG. 11 is a sectional view of the die into which the blowing jig and the parison 400 are inserted.
Figure 12:
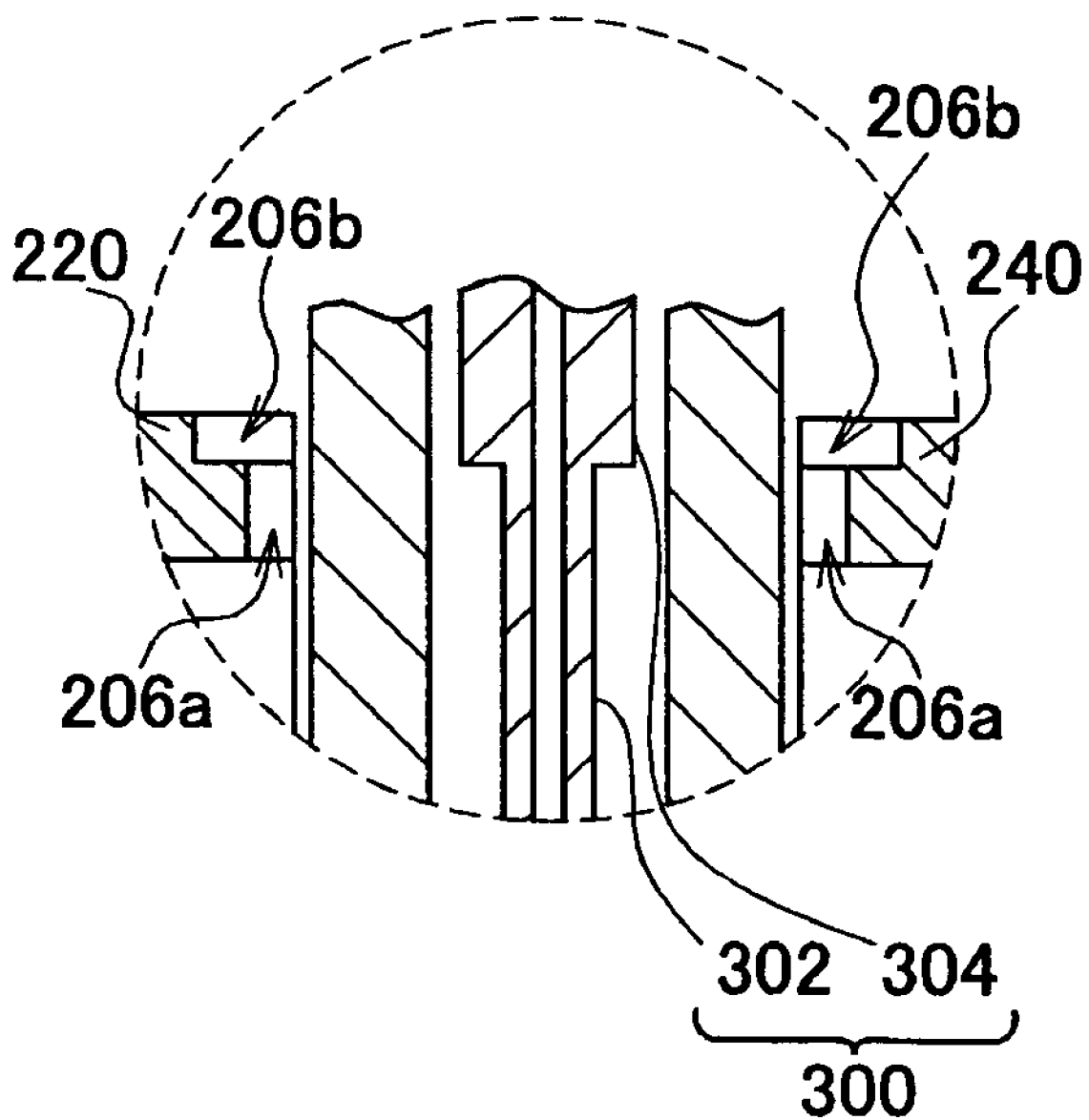
FIG. 12 is an enlarged view of the area surrounded by broken line.

FIG. 11 is a sectional view of the die 200 into which the blowing jig 300 and the parison 400 are inserted. FIG. 12 is an enlarged view of the area surrounded by broken line in FIG. 11. In FIG. 11, the die 220 is shown as the B-B sectional view in FIG. 2. As shown in FIG. 11, the blowing jig 300 for blowing air includes a tip part 302 and a root part 304 and the tip part 302 is formed so that the diameter of the tip part 302 is smaller than that of the root part 304.

In the case of molding the ink accommodating container 100, at first, the die 220 and the die 240 are separated from each other and the cylindrical parison 400 is located between the die 220 and the die 240. Next, the die 220 and the die 240 are combined together so that the parison 400 is sandwiched between the die 220 and the die 240. The outside diameter of the parison 400 is larger than the diameter of the blowing jig insertion opening 206 and the parison 400 includes the first base layer 131, the gas barrier layer 132, and the second base layer 133 in the order of the first base layer 131, the gas barrier layer 132, and the second base layer 133, from the inner side. The wall thickness of the parison 400 is thicker than the space between the blowing jig insertion opening 206 and the blowing jig 300 when the die 220 and the die 240 are combined together.

Next, the blowing jig 300 is inserted into the parison 400 so that the boundary between the tip part 302 and the root part 304 faces to the boundary between the root part forming part 206a and the tip part forming part 206b. Here, the cross-section area of each of the blowing jig insertion opening 206 and the blowing jig 300 is smaller than that of the parison 400. Thus, a section in the parison 400 is sandwiched between the blowing jig insertion opening 206 and the blowing jig 300, and consequently a part of the section is deformed along the shape of the space between the die 200 and the blowing jig 300. Therefore the part is molded to be smaller than the outside diameter of the parison 400 and thereby forms the supplying part 120 of the ink accommodating container 100. In this case, since the inside diameter of the tip part forming part 206b of the die 200 is larger than that of the root part forming part 206a, the outside diameter of the tip part 124 becomes larger than that of the root part 122. In addition, since the outside diameter of the root part 304 of the blowing jig 300 is larger than that of the tip part 302, the inside diameter of the tip part 124 becomes larger than that that of the root part 122.

Next, when air is blown from the blowing jig 300, the parison 400 protrudes and deforms along the shape of the concave part of the die 200 to form the ink accommodating container 100. In this case, the diagonal fold line 112 are formed by the diagonal fold line forming part 202b on both the side face 102 and the side face 103 of the ink accommodating container 100 and, the middle fold line 114 are formed by the resin case 202a. In addition, the assist fold line 116 is formed by the convex part 204a on both the side face 102 and the side face 103 of the ink accommodating container 100. Since the protrusion of each part corresponding to the front edge face 101 or the rear edge face 105 in the parison 400 is not very large, the thickness of each of the front edge face 101 and the rear edge face 105 is formed to be thicker than that of the side face 102, the side face 103, the upper face 104 or the rear edge face 105. Next, the metal layer 134 is vapor deposited to the outer surface of the ink accommodating container 100.

According to the present embodiment as described above, since the diagonal fold line 112 and the middle fold line 114 are formed on each of the side face 102 and the side face 103 of the ink accommodating container 100, both the side face 102 and the side face 103 are folded as the ink is being supplied from the ink accommodating container 100. Therefore, the amount of the ink left in the used ink accommodating container 100 is can be reduced. In addition, since the assist fold line 116 is formed on each of the upper face 104 and the bottom face 106, both the upper face 104 and the bottom face 106 are folded along the front edge face 101 and the rear edge face 105. Therefore, though both the front edge face 101 and the rear edge face 105 are not easily folded because they are formed to be thicker than the others faces, the amount of the ink left in the used ink accommodating container 100 can be reduced.

In addition, when using the direct blow molding method, though the outside diameter of the supplying part 120 of the ink accommodating container 100 is smaller than that of the parison 400, the supplying part 120 can be formed in the space between the blowing jig 300 and blowing jig insertion opening 206, into which the blowing jig 300 is inserted. Here, since the inside diameter of the tip part forming part 206b of the blowing jig insertion opening 206 is smaller than that of the root part forming part 206a, the outside of the tip part 124 of the supplying part 120 can be formed to be larger than the inside diameter of the root part 122. In addition, since the diameter of tip part 302 of the blowing jig 300 is smaller than the other parts, the inside diameter of the tip part 124 can be larger than that of the root part 122.

In addition, the ink-jet recording apparatus used with ink cartridge 10 is an example of the liquid ejecting apparatus. However, the present invention is not limited to this. A color filter manufacturing apparatus for manufacturing a color filter of a liquid crystal display could be another example of the liquid ejecting apparatus. In this case, a color material ejecting head of the color filter manufacturing apparatus is an example of the liquid ejecting head. Yet another example of the liquid ejecting apparatus is an electrode forming apparatus for forming electrodes such as an organic EL display, an FED (Field Emission Display) or the like. In this case, an electrode material (conductive on paste) ejecting head of the electrode forming apparatus is an example of the liquid ejecting head. Yet another example is a biochip manufacturing apparatus for manufacturing biochips. In this case, the cartridge of a biochip manufacture apparatus which holds organic substance and samples is an example of a liquid cartridge. The liquid ejecting apparatus of the present invention includes other liquid ejecting apparatuses used for industrial purposes. In addition, the recording medium is a material on which recording or printing is performed by ejection of liquid, which includes a recording paper, a circuit board on which circuit patterns such as display electrodes are formed, a CD-ROM on which a label is printed, a prepared slide on which a DNA circuit is recorded, etc.

Although the present invention has been described by way of exemplary embodiments, it should be understood that those skilled in the art might make many changes and substitutions without departing from the spirit and the scope of the present invention which is defined only by the appended claims.

What is claimed is:

1. A method for direct blow molding, comprising steps of:
preparing two dies of which an overlapping section overlaps with a blowing jig for blowing air and wherein a cross section area of at least a part of the overlapping section is smaller than a cross section area of a parison, when the two dies are combined together;
locating the two dies to each positions so that the two dies face each other across the parison; and
forming the overlapping section between the parison and the blowing jig, wherein the step of forming the overlapping section between the parison and the blowing jig comprises steps of:
inserting the blowing jig into an inside of the parison;
combining the two dies together; and
forming the overlapping section between the parison and the blowing jig to be smaller than an outside diameter of the parison by using a space between the two dies and the blowing jig,
wherein the step of preparing two dies comprises: a step of preparing a die for manufacturing a liquid accommodating container for keeping a liquid which is to be supplied to a liquid ejecting apparatus to record by ejecting the liquid;

wherein the liquid accommodating container formed by the die comprises a supplying part for supplying the liquid in the liquid accommodating container to the liquid ejecting apparatus, and the supplying part protrudes from the liquid accommodating container, is integrated with the liquid accommodating container, and is a hollow member allowing communication with inside of the liquid accommodating container;

wherein the step of forming the overlapping section between the parison and the blowing jig comprises a step of forming the supplying part by using a space between the two dies and the blow jig;

wherein the method further comprises a step of blowing air from the blowing jig to form the parison into a shape of the liquid accommodating container; and wherein the parison comprises a low density polyethylene layer, an ethylene-vinylalcohol copolymer layer and a liner low density polyethylene layer in this order from inner side, and the liquid accommodating container is formed by resin which is stacked with the low density polyethylene, the ethylene-vinylalcohol copolymer and the liner low density polyethylene in this order.

2. A method for direct blow molding as claimed in claim 1, wherein.

* * * * *